(12) United States Patent
Ramaiah et al.

(10) Patent No.: US 9,989,240 B2
(45) Date of Patent: Jun. 5, 2018

(54) LED LAMPS FOR RETROFIT ON HIGH WATTAGE METAL HALIDE BALLASTS

(71) Applicant: GE LIGHTING SOLUTIONS, LLC, East Cleveland, OH (US)

(72) Inventors: Raghu Ramaiah, Mentor, OH (US); Thomas Alexander Knapp, Cleveland, OH (US); Thomas Clynne, East Cleveland, OH (US); Benjamin Michael Pax, East Cleveland, OH (US)

(73) Assignee: GE LIGHTING SOLUTIONS, LLC, East Cleveland, OH (US)

( * ) Notice: Subject to any disclaimer, the term of this patent is extended or adjusted under 35 U.S.C. 154(b) by 162 days.

(21) Appl. No.: 14/956,430

(22) Filed: Dec. 2, 2015

(65) Prior Publication Data
US 2016/0161103 A1    Jun. 9, 2016

Related U.S. Application Data

(60) Provisional application No. 62/087,099, filed on Dec. 3, 2014.

(51) Int. Cl.
*F21V 29/77* (2015.01)
*F21V 29/60* (2015.01)
(Continued)

(52) U.S. Cl.
CPC .............. *F21V 29/773* (2015.01); *F21K 9/23* (2016.08); *F21K 9/232* (2016.08); *F21V 23/009* (2013.01);
(Continued)

(58) Field of Classification Search
CPC ........ F21V 29/773; F21V 29/60; F21V 29/503; F21V 9/60; F21V 9/232; F12V 23/009
See application file for complete search history.

(56) References Cited

U.S. PATENT DOCUMENTS 7,434,964 B1   10/2008  Zheng et al.
7,557,521 B2 *  7/2009  Lys ..................... F21S 48/325
                                                        315/224
(Continued)

FOREIGN PATENT DOCUMENTS

CN    201396602 Y    2/2010
CN    202546496 U    11/2012
(Continued)

OTHER PUBLICATIONS

U.S. Non-Final Office Action issued in connection with related U.S. Appl. No. 14/807,114 dated Sep. 23, 2016.
(Continued)

*Primary Examiner* — Anabel Ton
(74) *Attorney, Agent, or Firm* — Peter T. DiMauro; GE Global Patent Operation

(57) ABSTRACT

According to some embodiments, a system and housing provide a lamp including a heat sink including: an annular tube including a first end and a second end, a plurality of fins extending radially from a exterior surface of the annular tube, wherein a length of each fin extends from the first end of the annular tube to the second end of the annular tube; a plurality of light sources in thermal contact with the heat sink; a driver circuit operative to provide the input voltage and current for the plurality of light sources; and a capper positioned at the second end of the annular tube, wherein the capper is operative to be received in a socket. Numerous other aspects are provided.

24 Claims, 20 Drawing Sheets

(51) Int. Cl.
  *F21V 23/00* (2015.01)
  *F21K 9/23* (2016.01)
  *F21K 9/232* (2016.01)
  *F21V 29/503* (2015.01)
  *F21V 29/508* (2015.01)
  *F21Y 115/10* (2016.01)
  *F21Y 107/30* (2016.01)

(52) U.S. Cl.
  CPC ............ *F21V 29/60* (2015.01); *F21V 29/503* (2015.01); *F21V 29/508* (2015.01); *F21Y 2107/30* (2016.08); *F21Y 2115/10* (2016.08); *Y02B 20/386* (2013.01)

(56) References Cited

U.S. PATENT DOCUMENTS

| | | | |
|---|---|---|---|
| 7,736,033 B2* | 6/2010 | Patel | F21S 6/002 307/43 |
| 7,810,974 B2 | 10/2010 | Van Rijswick et al. | |
| 8,277,109 B2 | 10/2012 | Ko | |
| 8,414,160 B2* | 4/2013 | Sun | F21K 9/90 313/46 |
| 8,446,004 B2 | 5/2013 | Loh et al. | |
| 8,534,880 B1 | 9/2013 | Berg et al. | |
| 8,596,821 B2 | 12/2013 | Brandes et al. | |
| 8,679,626 B2 | 3/2014 | Heo et al. | |
| 2002/0041165 A1 | 4/2002 | Cammack | |
| 2004/0263091 A1 | 12/2004 | Deurloo et al. | |
| 2005/0093479 A1 | 5/2005 | Deurloo et al. | |
| 2010/0188026 A1 | 7/2010 | Cook et al. | |
| 2011/0140586 A1 | 6/2011 | Wang | |
| 2011/0221324 A1 | 9/2011 | Lee | |
| 2012/0080699 A1 | 4/2012 | Chowdhury et al. | |
| 2012/0238674 A1 | 9/2012 | Atarashi et al. | |
| 2012/0287617 A1 | 11/2012 | Mekhtarian | |
| 2012/0313518 A1* | 12/2012 | Sun | F21K 9/90 315/32 |
| 2012/0314414 A1 | 12/2012 | Flaherty et al. | |
| 2012/0320594 A1 | 12/2012 | Chien | |
| 2013/0153943 A1 | 6/2013 | Lee | |
| 2013/0235586 A1 | 9/2013 | Gielen et al. | |
| 2013/0301280 A1 | 11/2013 | Matsuda et al. | |
| 2013/0322076 A1 | 12/2013 | Parker et al. | |
| 2014/0191672 A1 | 7/2014 | Stack | |

FOREIGN PATENT DOCUMENTS

| | | |
|---|---|---|
| EP | 2292973 A1 | 3/2011 |
| JP | 2007173729 A | 7/2007 |
| JP | 2010182796 A | 8/2010 |
| JP | 2012146425 A | 8/2010 |
| KR | 20130111516 A | 10/2013 |
| WO | 2011024102 A1 | 3/2011 |
| WO | 2013169033 A1 | 11/2013 |

OTHER PUBLICATIONS

PCT Search Report and Written Opinion issued in connection with Related PCT Application No. PCT/US2015/042649 dated Nov. 9, 2015.

PCT Search Report and Written Opinion issued in connection with corresponding PCT Application No. PCT/US2015/063583 dated Feb. 11, 2016.

U.S. Notice of Allowance issued in connection with related U.S. Appl. No. 14/807,114 dated May 24, 2017.

\* cited by examiner

LED LAMPS FOR RETROFIT ON HIGH WATTAGE METAL HALIDE BALLASTS

RELATED APPLICATIONS

The present application claims priority to U.S. Provisional Patent Application Ser. No. 62/087,099, filed Dec. 3, 2014, and entitled "LED Lamps for Retrofit on High Wattage Metal Halide Ballasts", which is hereby incorporated herein by reference in its entirety for all purposes.

FIELD OF THE INVENTION

Embodiments of the present invention generally relate to certain LED lamps that may be retrofit onto a ballast used for high-wattage metal halide lamps, and fit in existing HID fixtures.

BACKGROUND OF THE INVENTION

High Intensity Discharge (HID) lamps (e.g., high wattage metal halide lamp) convert input electrical energy into light energy by a relatively inefficient process. In particular, the conversion process uses the input electrical energy to increase the energy of electrons/ions in a plasma, and by their collision with neutral metal atoms in vapor phase, produces light. The energy of electrons/ions in a plasma, however, is a Maxwellian distribution, i.e., a small fraction of these energy particles are capable of exciting the metal atoms to the quantum states necessary to produce visible light. Per the process described above, the energy efficiency of converting the input electrical energy into useful light radiation is low, as only about 20% of input energy is converted to useful light radiation.

By contrast, due to the mechanism for light generation in Light Emitting Diodes (LED) lamps, the conversion efficiency is usually double, with about 40-50% of the input electrical energy being converted to useful light radiation. For LEDs, the mechanism of energy transfer from input to light generating mechanism is more efficient. In particular, light is generated when the conduction band electron re-combines with a hole in the valence band of the semi-conductor. The semiconductor is created by doping the dielectric with donor (n-type) or acceptor (p-type) atoms. An LED is created by a sandwich of these n-type and p-type materials, chosen such that the energy difference from conduction band to valence band is equal to the energy of the light emitted (i.e., desired frequency or wavelength). This sandwich is inherently a structure that has free electrons and holes, due to the fact that the temperature of the specimen is at a temperature which is greater than absolute zero. When an electric field is applied across the sandwich, energy is transferred to electrons and holes more directly by increasing the drift velocity of these particles. Thus, more electrons can make the transition from the valence band to the conduction band, creating holes, and these electrons thus recombine with holes generating the desired radiation.

While a standard high wattage Metal Halide lamp (e.g., an HID lamp), such as a 400 W lamp, typically has a system luminous efficacy of about 60 LPW, an equivalent LED lamp may often have a system efficacy of about 105 LPW. However, it is costly to replace HID lamps and the associated already installed pre-existing electrical components with LED fixtures.

Accordingly, the present inventors have recognized that a need exists for an improved LED lamp that may be operated on already installed HID electrical components and existing fixtures.

SUMMARY OF THE INVENTION

In one embodiment, a lamp includes a heat sink including: an annular tube including a first end and a second end, a plurality of fins extending radially from an exterior surface of the annular tube, wherein a length of each fin extends from the first end of the annular tube to the second end of the annular tube; a plurality of light sources in thermal contact with the heat sink); a driver circuit operative to provide the input voltage and current for the plurality of light sources; and a capper positioned at the second end of the annular tube, wherein the capper is operative to be received in a socket.

In another embodiment a housing includes an annular tube including a first end and a second end; a plurality of fins extending radially from an exterior surface of the annular tube; and wherein a length of each fin extends from the first end of the annular tube to the second end of the annular tube.

BRIEF DESCRIPTION OF THE DRAWINGS

Aspects and/or features of the invention and many of their attendant benefits and/or advantages will become more readily apparent and appreciated by reference to the detailed description when taken in conjunction with the accompanying drawings, which drawings may not be drawn to scale.

DETAILED DESCRIPTION

Some embodiments may include an improved LED lamp that may be operated on already installed HID electrical components. While the aspects of the disclosed embodiments are generally described herein with respect to an LED light source, the aspects of the disclosed embodiments apply to any suitable solid-state light source. As used herein, the term "solid-state light source" (or SSL source) includes, but is not limited to, light-emitting diodes (LEDs), organic light-emitting diode (OLEDs), polymer light-emitting diodes (PLEDs), laser diodes, or lasers. In addition, although the figures depict LED light sources, it should be understood that other types of SSL sources could be utilized in some embodiments in accordance with the novel implementations described herein.

Figure 1A:
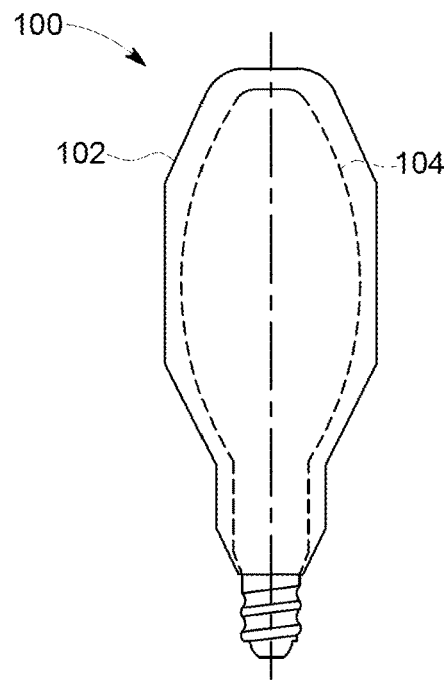
FIG. 1A illustrates an ANSI outline of a 400 W metal halide lamp.
Figure 1B:
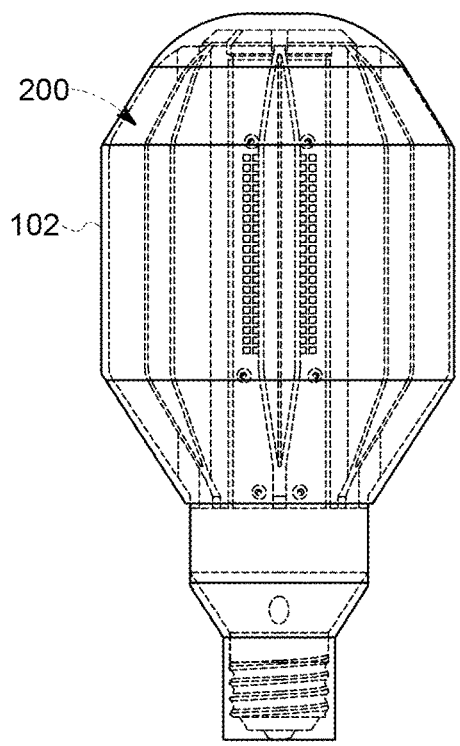
FIG. 1B illustrates an LED lamp design housed within the ANSI outline, according to some embodiments.

A technical effect of some embodiments, is that the LED lamp may fit within an existing HID lamp envelope, to minimize fixture fit issues. For example, HID lamps typically have a defined maximum outline drawing, to allow fixture manufacturers to provide enough room inside the fixture for inserting and fitting the lamp. For a given lamp type, standard outline drawings may be found in American National Standards Institute (ANSI) and International Electrotechnical Commission (IEC) specifications, for example. FIG. 1A, for example, illustrates the ANSI outline 102 (e.g., 141.4 mm diameter) for an HID 400 W lamp, where the dashed line 104 is the nominal lamp design outline (e.g., 120 mm diameter) used by most manufacturers. Embodiments of the invention are sized to fit within the maximum outline (e.g., approximately 141 mm in diameter), and the nominal lamp (e.g., approximately 120 mm in diameter) design, as shown, for example, in FIG. 1B.

A technical effect of some embodiments is that that a lamp including an aluminum heat sink is provided, which may be powder coated with white paint to improve reflectivity. In one or more embodiments, the heat sink may be coated with a highly reflective matte finish coating, which may help the light distribution of the example lamp better match the conventional HID lamp. The heat sink may include LEDs arranged on a flexible Printed Circuit Board (PCB), or Metal Core Printed Circuit Boards (MCPCB) or a resin-based circuit board (e.g., FR4). These LEDs may be powered by a driver circuitry contained within the heat sink that may take the input power from the HID ballast and convert the input power to a suitable DC voltage and current, specifically designed to operate the LEDs at a desired power for optimal light efficacy. Embodiments of the invention provide a heat sink inner diameter that is large enough to accommodate the driver and Extra Capacitor (EC), where the heat sink is capable of dissipating over 80 thermal watts without extending beyond the ANSI profile.

Turning to FIGS. 2A-6C, an example lamp 200 is provided. The lamp 200 may include a heat sink 202, a plurality of light sources (e.g., light emitting diodes (LED)) 204, one or more Printed Circuit Boards (PCB) 206, a driver circuit 208, a base connector 210 and a top cap 211. As used herein, "base connector" and "capper" may be used interchangeably. In one or more embodiments, the base connector 210 may include geometry and features 209 (e.g., grooves) that provide for the lamp 200 to be a compatible screw-in (via the base connector 210) replacement for use with conventional HID electrical components.

An important aspect of LED lamp design for HID lamp retrofits may be managing the thermal dissipation of the system. It may be desirable to generate a higher light level (about 20,000 lumens or more), than with the HID lamps. As such, a significant amount of thermal power generated by the LEDs may be managed and dissipated in a manner that permits long life and reliability of the lamp 200.

In one or more embodiments, the heat sink 202 may transfer the heat generated by LED operation to the ambient environment outside the lamp 200. Conventionally, heat energy transferred between a surface and a moving fluid at different temperatures is known as convection. Convective heat transfer may take the form of either forced or assisted convection (e.g., when a fluid flow is induced by an external force, such as a pump, fan or a mixer) and natural or free convection (e.g., caused by buoyancy forces due to density differences caused by temperature variations in the fluid. During heating, the density change in the boundary layer will cause the fluid to rise and be replaced by cooler fluid that also will heat and rise.)

In one or more embodiments, the heat sink 202 may include an annular tube 212 including a first end 214 and a second end 216, the second end 216 positioned opposite the first end 214. In some embodiments, the annular tube 212 may have a diameter of approximately 52 mm. Other suitable diameters, ranging from 10 mm to 100 mm, and in some embodiments from 40-60 mm may be used. In some embodiments, a plurality of fins 218 (e.g., 8, 12, 16, etc.) may extend radially from an exterior surface 220 of the annular tube 212. In some embodiments, a length of each fin 218 may extend from the first end 214 of the annular tube 212 to the second end 216 of the annular tube 212.

Each fin 218 may include a root 222 (e.g., the end integrally formed with, or connected to, the annular tube 212) and a free-end or tip 224 (e.g., the end not integrally formed with, or connected to, the annular tube 212), positioned opposite the root 222. In some embodiments, a width of the root 222 may be approximately 2 mm. Other suitable widths, ranging from 1 mm to 10 mm may be used. In some embodiments, a width of the free-end 224 may be the same as the width of the root 222, while in other embodiments the width of the free-end 224 may be larger or smaller than the width of the root 222.

In some embodiments, the free-end 224 may be split or forked, and include two or more tines 226. As used herein, the terms "split" and "forked" may be used interchangeably. In some embodiments, a distance between two adjacent tines 226 at a split location 228 (e.g., location on the fin 218 where the fork begins) is approximately 1.5 mm. Other suitable measurements ranging from 1 mm to 10 mm may be used. In some embodiments, the distance between adjacent tines is about 10 mm for best thermal performance.

Figure 4A:
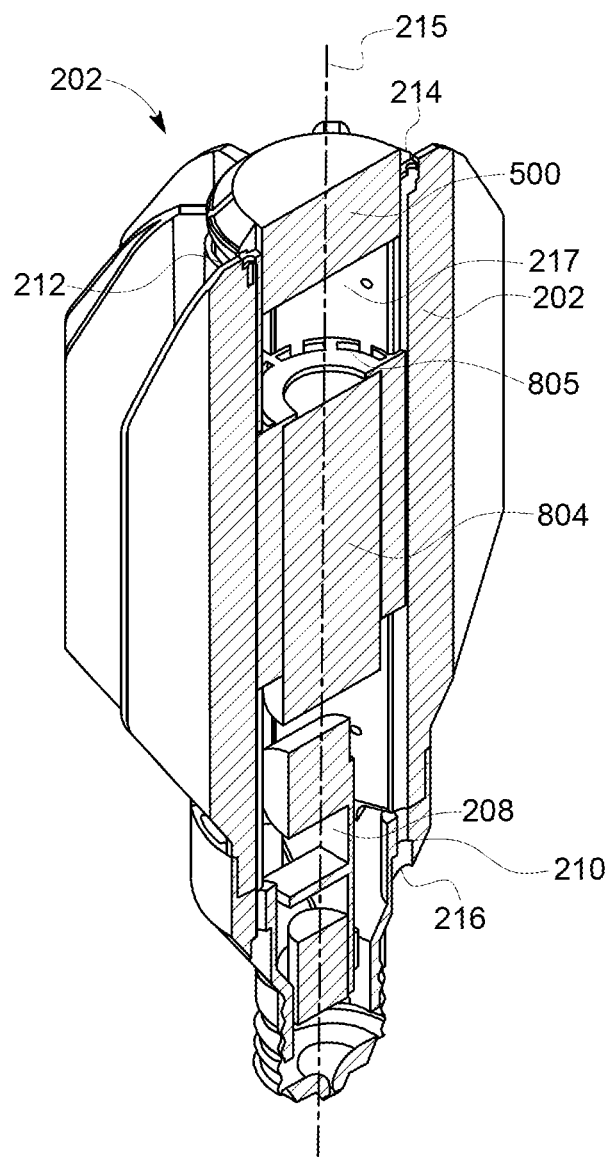
FIG. 4A illustrates a perspective cross-sectional view of the LED lamp design, according to some embodiments.
Figure 4B:
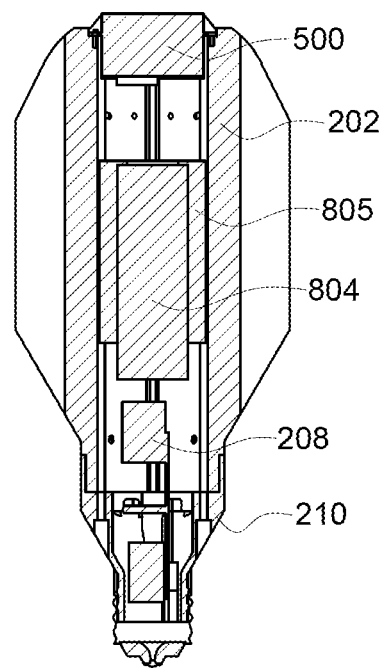
FIG. 4B illustrates a side section view of the LED lamp design, according to some embodiments.
Figure 4C:
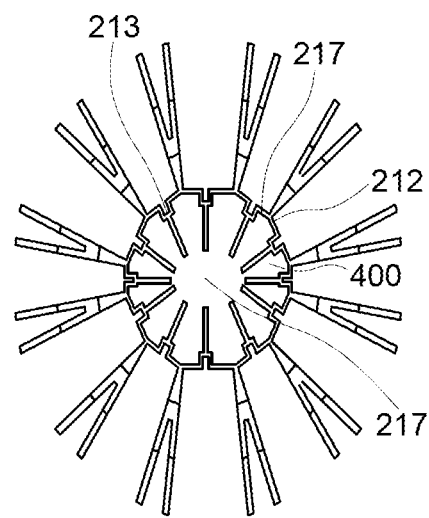
FIG. 4C illustrates a top view of the LED lamp heat sink design illustrated in FIG. 4A, according to some embodiments.
Figure 5:
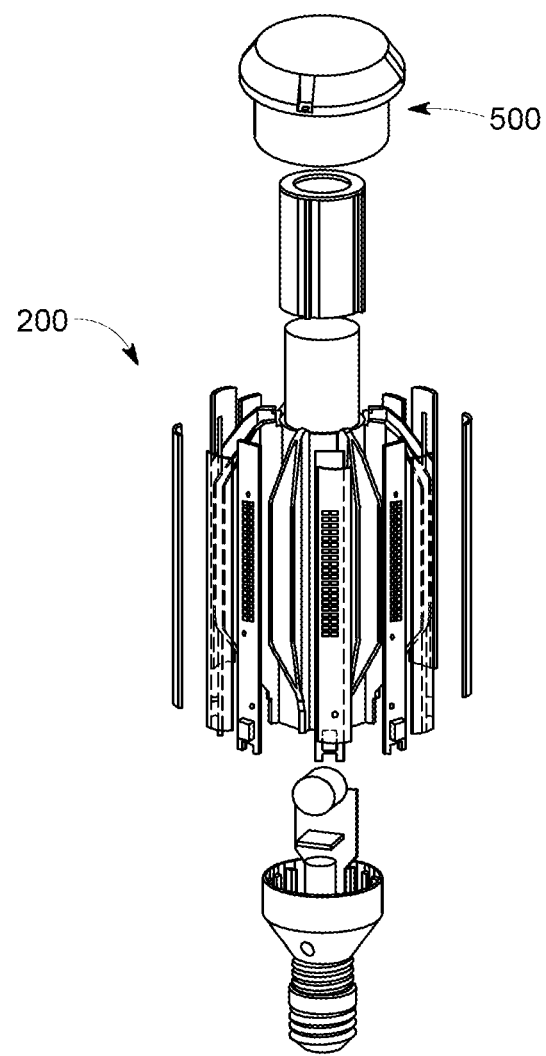
FIG. 5 illustrates an exploded view of the LED lamp design, according to some embodiments.
Figure 6A:
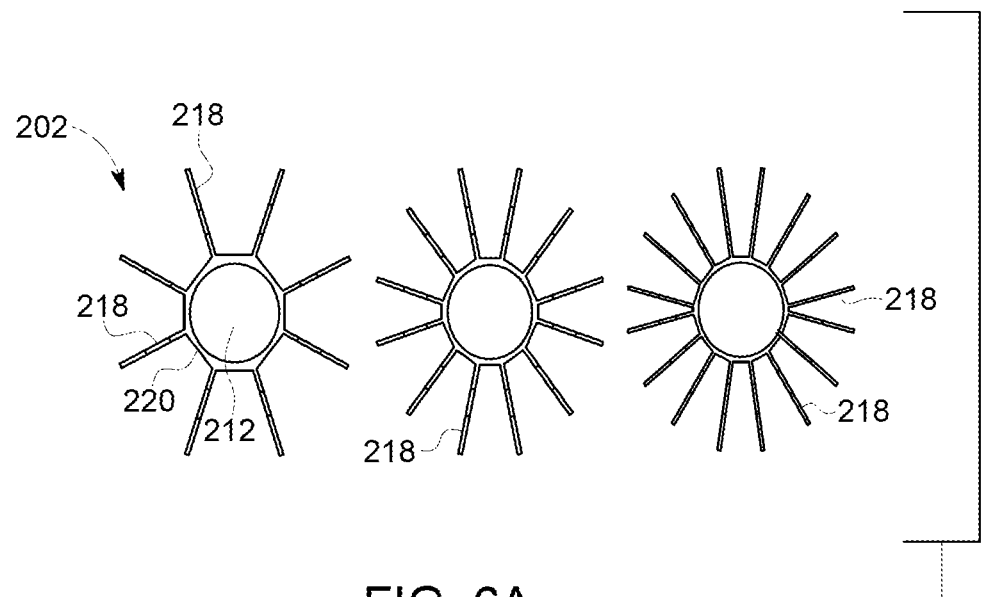
FIGS. 6A-6C illustrate a top view of LED lamp heat sink designs, according to some embodiments.
Figure 6B:
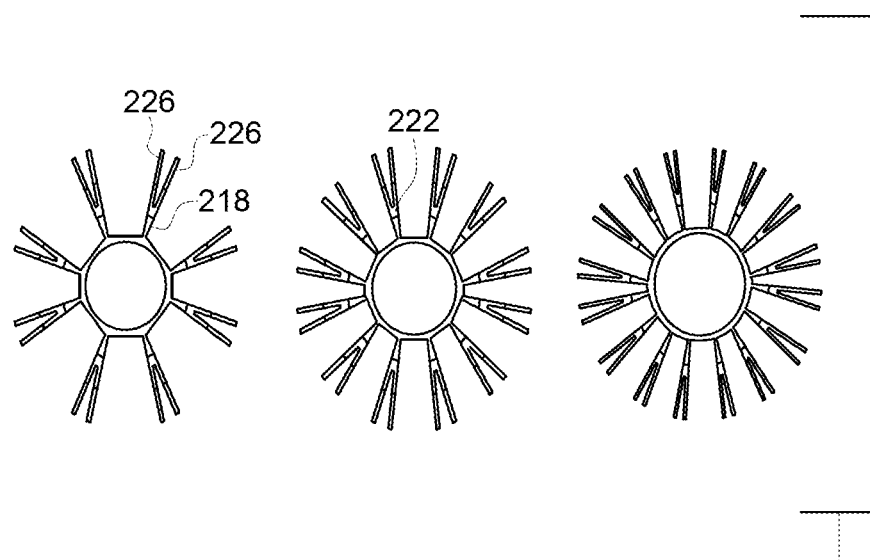

While the heat sink in FIGS. 2A-5 includes eight fins 218, heat sinks 202 having different numbers of fins 218 may be used. For example, FIGS. 6A and 6B show heat sinks 218 having 8, 12 and 16 fins. Other suitable numbers of fins, ranging from 4 fins to 24 fins, may be used. In one or more embodiments, the number of fins may be associated with different heat sink metrics. For example, a width 302 (FIG. 3B) of an exterior surface 220 of the annular tube 212 between roots 222 of adjacent heat sinks 202 may be, for example, 20.8 mm with 8 fins, 12.8 mm with 12 fins and 9 mm with 16 fins. Other suitable widths, ranging from 5 mm to 50 mm may be used. As another example, a fin length 304 (FIG. 3B) from the fin tip 224 to the exterior surface 220 of the annular tube 212 may be 39.4 mm with 8 fins, 40.6 mm with 12 fins, and 40.9 mm with 16 fins. Other suitable lengths may be used. As yet another example, a length 306 (FIG. 3B) from the split location 228 to the fin tip 224 (e.g., the fin split depth) may be 25.1 mm with 8 fins, 24.8 mm with 12 fins, and 24.8 mm with 16 fins. Other suitable lengths may be used.

While the heat sink in FIGS. 2A-5, 6B and 6C include a split or forked fin, in one or more embodiments, the fin may be straight (e.g., without a split or fork), as shown in FIG. 6A. Of note, forked fins may dissipate heat generated by the LEDs more efficiently than straight fins. In general, adding more fins may improve heat dissipation, but may also add more PCBs, more mass, and more surface area where light will be absorbed. Thus, the tradeoffs between thermal efficiency, optical efficiency, mass, and cost suggest that the best heat sink has 8 split fins.

Figure 6C:
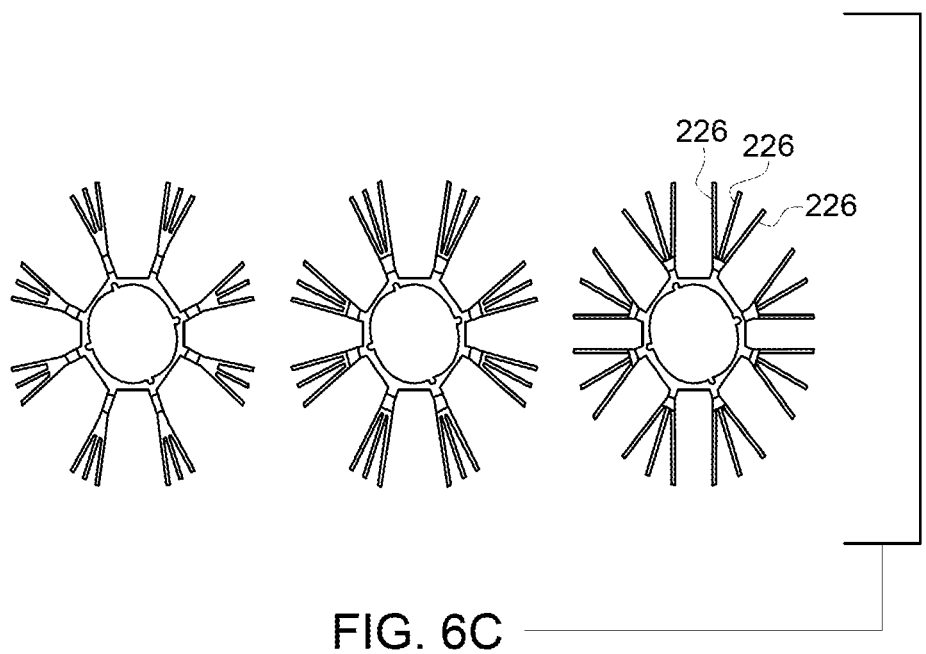

While the heat sink 202 in FIGS. 2A-5 includes forked fins having two tines 226, in one or more embodiments, more than two tines 226 may be used. For example, FIG. 6C illustrates heat sinks 218 including three tines 226 on each of 8, 12 and 16 fins. Of note, the tri-fork design of FIG. 6C may dissipate heat from the heat sink 202 less effectively than the bi-fork design of FIGS. 2A-5. The inventors suggest that the reason for less effective performance of the tri-fork design is that as the distance between two vertical parallel surfaces decreases, the boundary layers of those surfaces increasingly interfere with each other. Though the fins are not actually parallel, the closer fin proximity may increase flow resistance due to viscous forces at the fin surfaces. Higher flow resistance means lower mass flow rate, which in turn reduces the convective heat transfer coefficient, h. Additionally, closer fin surfaces may intercept more radiation from neighboring fins, leading to reduced net radiation heat transfer from the heat sink. To improve performance of the tri-fork design, the split fins may be spread farther apart from each other. However, there may be an optical trade-off to spreading the fins farther apart, as the fins may block light from escaping to the ambient and therefor decrease optical efficiency. In some embodiments, an ideal optical quantity of fins may be the fewest fins that offer sufficient thermal performance, optical performance and aesthetic appearance. The inventors note that while the bi-fork design of FIGS. 2A-5 may not transfer heat as well as some of the tri-fork designs (e.g., FIG. 6C-3), the bi-fork design of FIGS. 2A-5 may have a greater optical efficiency than any of the tri-fork designs of FIG. 6C.

In some embodiments, an interior surface 213 of the annular tube 212 may include internal fins 400, as illustrated in FIG. 4C. The internal fins 400 may extend radially inward towards a central axis 215 (FIG. 4A) of an interior 217 of the annular tube 212. Like the fins 218 on the exterior surface 220 of the annular tube 212, the internal fins 400 may extend from the first end 214 to the second end 216 of the annular tube 212.

Figure 2A:
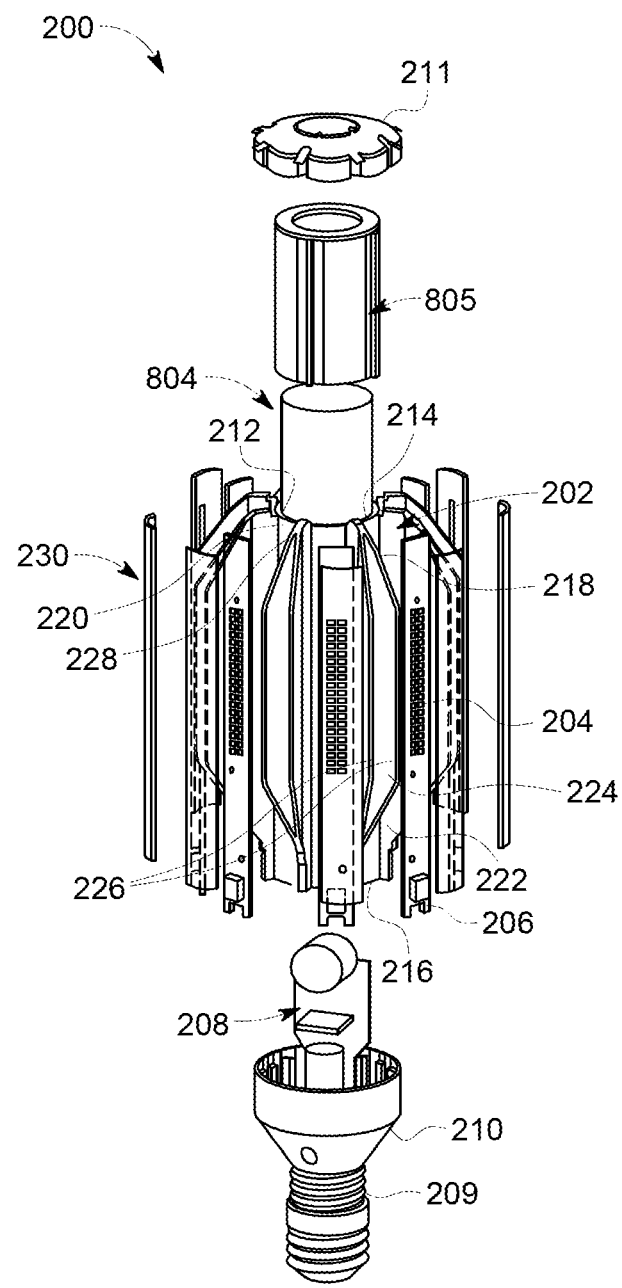
FIG. 2A illustrates an exploded view of an LED lamp design, according to some embodiments.

In one or more embodiments, the solid cap 211 shown in FIG. 2A may include vents (not shown) for allowing free convection airflow into the internal channel 217 of heat sink 202 in FIG. 4C.

Figure 2B:
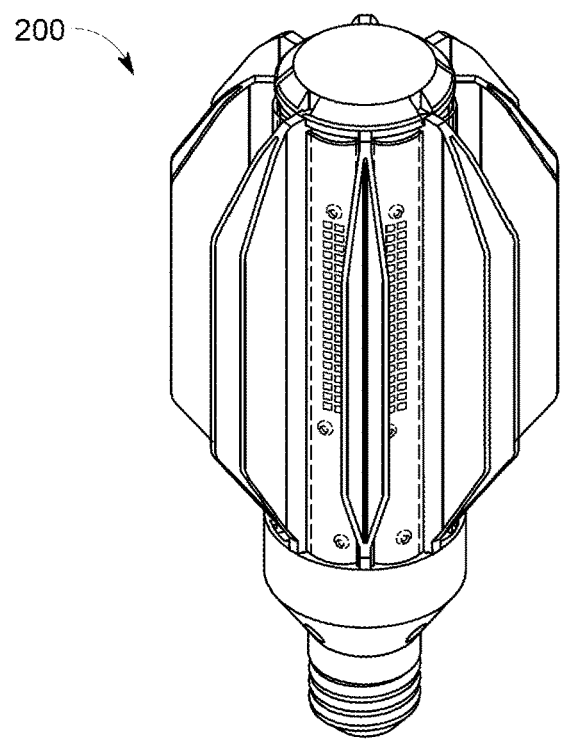
FIG. 2B illustrates a perspective view of an assembled LED lamp with an air flow generator, according to some embodiments.
Figure 2C:
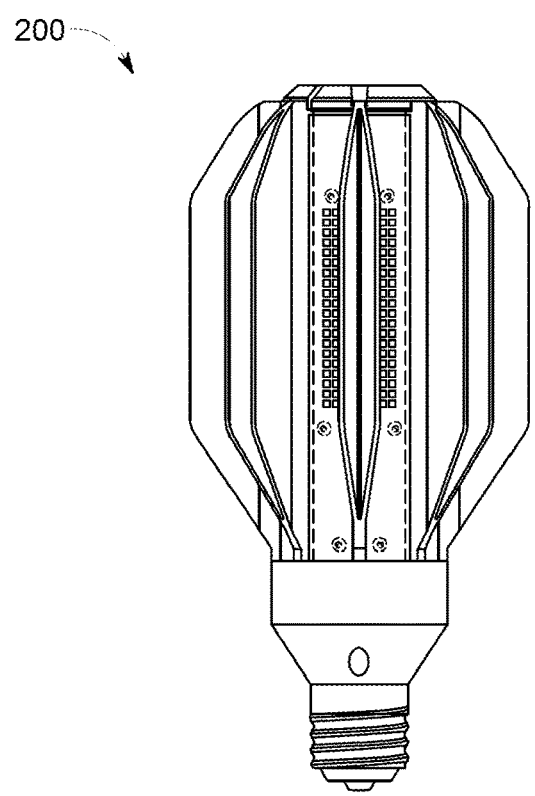
FIG. 2C illustrates a front view of an assembled LED lamp with an air flow generator, according to some embodiments.
Figure 3A:
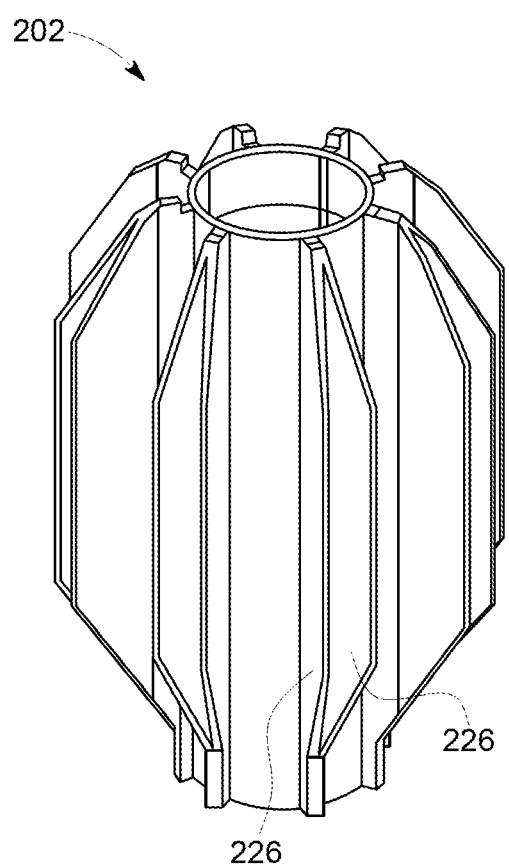
FIG. 3A illustrates a perspective view of an LED lamp heat sink design, according to some embodiments.
Figure 3B:
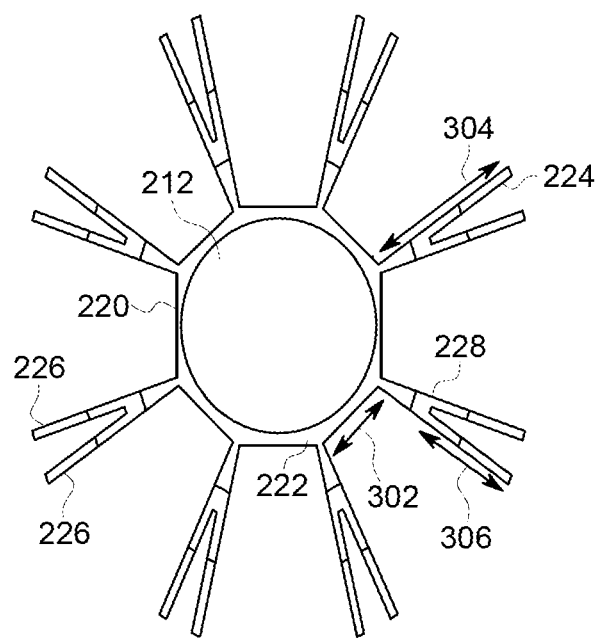
FIG. 3B illustrates a top view of an LED lamp heat sink design illustrated in FIG. 3A, according to some embodiments.

In one or more embodiments, the addition of internal fins 400 and a vented cap 402 may further dissipate the heat from the heat sink compared to the embodiment shown in FIG. 2 without internal fins 400, and with the solid cap 211.

In some embodiments, forced convection may be applied to the lamp 200 to further dissipate the heat generated by the LEDs. For example, the lamp 200 may include an air flow generator (e.g., an external fan or a synthetic jet) 500 to create a forced convection, as illustrated in FIGS. 4A, 4B and 5, by actively moving the air. The air flow generator 500 may be positioned at the first end 214 of the annular tube 212 instead of the solid cap 211. It is of significance to note that the air-flow may be substantially on the external surfaces. The advantage of this sort of forced air flow on the exterior is that the interior may be made hermetic, and seal against moisture for sensitive driver components. In one or more embodiments, the air flow generator 500 may create forced convection, which may enable more current to the LEDs 204, and driver 208, thereby creating more lumens compared to an embodiment without the air flow generator 500, as the air flow generator 500 may help to extract and dissipate the additional heat created by the greater current.

In one or more embodiments, PCBs 206 may be mounted on the exterior surface 220 of the annular tube 212. In one or more embodiments, the driver 208 may be contained in the interior 217 of the annular tube 212. In one or more embodiments, an optic 230 may be placed on top of the LEDs 204 or the LEDs 204 may be covered with a compound (e.g., a silicone compound), as a safety consideration to protect the LEDs. In one or more embodiments the optic 230 may be transparent. In one or more embodiments, the compound may be organic polysilazane, which may enable the LED to be exposed without the need for additional protective covers. The polysilazane may convert organic precursors to inorganic $SiO_2$ or hybrid $SiO_2$. The transparent optic 230 may not impact the thermal dissipation to any significant measure.

Figure 7A:
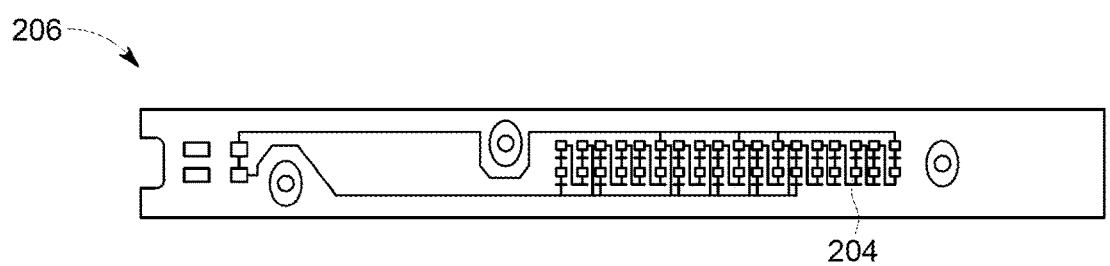
FIGS. 7A and 7B illustrate a PCB design used with the LED lamp design in FIGS. 2 and 3, respectively, according to some embodiments.
Figure 7B:
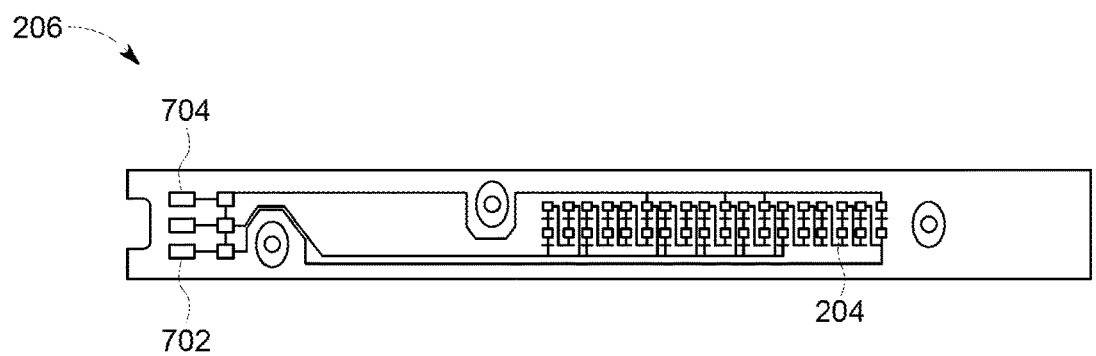

Turning to FIGS. 7A and 7B, a PCB 206 design used with the LED lamp design in FIGS. 2A and 5, respectively, according to some embodiments is provided. In some embodiments, the plurality of LEDs 204 may be mounted to the PCB 206. In one or more embodiments, the LEDs may be DC LEDs or AC LEDs. Of note, while all LEDs are inherently DC devices, the concept of an AC LED is to include the necessary rectifying components at the LED chip level. In one or more embodiments, the LEDs 204 may be mounted in a linear arrangement, as shown in FIGS. 7A and 7B. The linear arrangement may facilitate light distribution. Of note, the light generated by the LEDs may bounce off the fins 218 and facilitate light distribution by producing a desirable "down light." As used herein "down light" may be any light directed towards the ground and "up light" may be any light directed away from the ground. The terms "down light" and "up light" may be independent of the orientation of the lamp. The LEDs may operate with power supplied by the PCB. In some embodiments, the PCB 206 may have a length of approximately 208 mm and a width of approximately 17 mm. Other suitable lengths and widths may be used. For example, a width of approximately 17 mm may be suitable for an 8 fin bi-fork heat sink design that has a surface width 402 of 20.8 mm, but may be too wide for a 12 and 16 fin bi-fork heat sink design that may have a surface width 402 of 12.8 mm and 9 mm, respectively. FIG. 7A illustrates a PCB 206 design used without an air flow generator, according to some embodiments. FIG. 7B illustrates a PCB 206 design that may be used with an air flow generator. In one or more embodiments, the air flow generator 500 may receive power from the LEDs 204. This is not intended to indicate that the LEDs themselves are power sources; rather, the flow of current may be essentially in a direction from the LEDs 204 to the air flow generator 500. In some embodiments, the two or more LEDs in series may provide power to the air flow generator 500 via contacts 702, 704 that are electrically coupled thereto. In one or more embodiments, the air flow generator 500 may be powered by the driver directly (e.g., PCB 206 in FIG. 7A), or the air flow generator 500 may be powered off the PCB 206 in FIG. 7B.

In one or more embodiments, the overall length of LEDs may mimic the arc-length of a conventional HID lamp, which may be important for a retrofit application, as fixtures may be designed to use the existing arc-length of conventional HID lamps to better control the light distribution. The inventors note that if the overall length of LED's in a LED retrofit device does not mimic the arc-length of the existing HID fixture in which such a lamp is placed, optical efficiency may not be optimal.

Figure 8A:
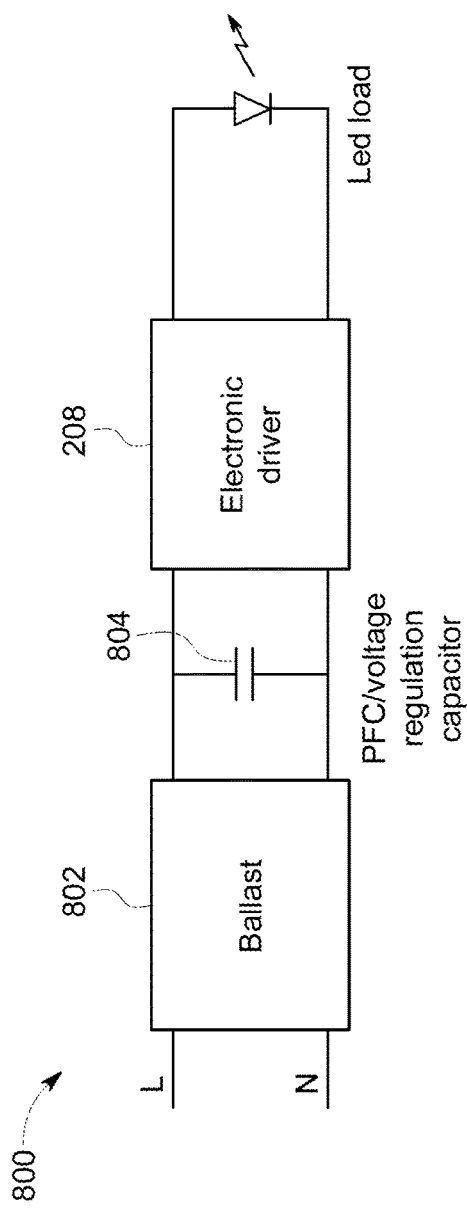
FIGS. 8A and 8B illustrate a block diagram and circuit topology, respectively, for the electrical interface between an existing ballast of an HID lamp and the LED lamp, according to some embodiments.
Figure 8B:
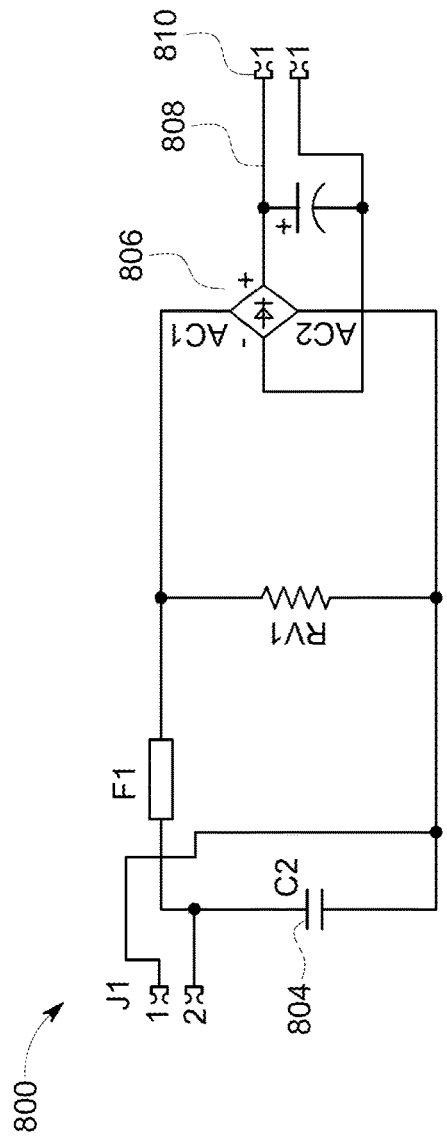
Figure 8C:
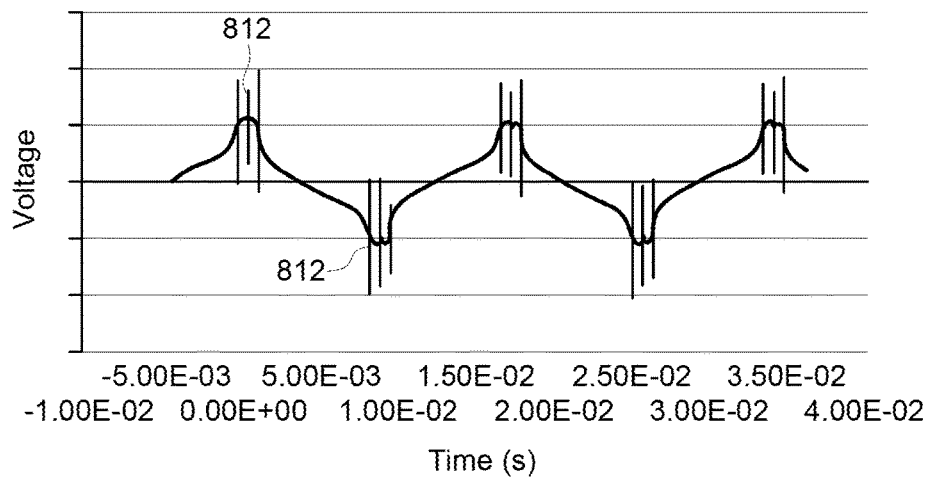
FIG. 8C illustrates a graph of ballast output for existing HID lamps.

Turning to FIGS. 8A and 8B a block diagram and circuit topology, respectively, for an electrical interface 800 between an existing ballast 802 of an HID lamp and the LED lamp 200, according to some embodiments is provided. As shown in FIG. 8A, the electrical interface may include the existing ballast 802, electrically coupled to the electronic driver 208. In some embodiments, the electronic driver 208 may convert AC power to DC power to operate the LED lamp 200. In some embodiments, AC LEDs and drivers may be used to reduce component counts and overall size of the circuit. Of note, some existing ballasts 802 may out put a lot of heat, which may be detrimental to the electronic driver 208. In one or more embodiments, the electrical interface may include a PFC/voltage regulation capacitor, which may also be referred to herein as an Extra Capacitor (EC) 804. As used herein, the EC 804 may be considered to be part of the electronic driver 208. The EC 804 may allow the high voltage output from the existing ballast 802 to bypass the electronic driver 208 to avoid harming the electronic driver. In one or more embodiments, the EC 804 may be housed in a nest 805 (FIGS. 2A and 4A) within the annular tube 212. In one or more embodiments the lamp fixture (not shown) may be thermally tied to the heat sink 202 for a conductive path combined with fins 218 for a convective/radiative path.

FIG. 8B provides the circuit topology (e.g., rectifier design) associated with the block diagram illustrated in FIG. 8A. In some embodiments, the rectifier design shown herein may function as the interface 800 between the existing ballast 802 and the LEDs 204. In some embodiments, the rectifier design may include a bridge diode assembly 806 and a smoothing capacitor (C1) 808. In one or more embodiments, the smoothing capacitor 808 may charge and discharge to provide steady power to driver outputs 810 (J3/J4), which may then be received by the LEDs.

Figure 9A:
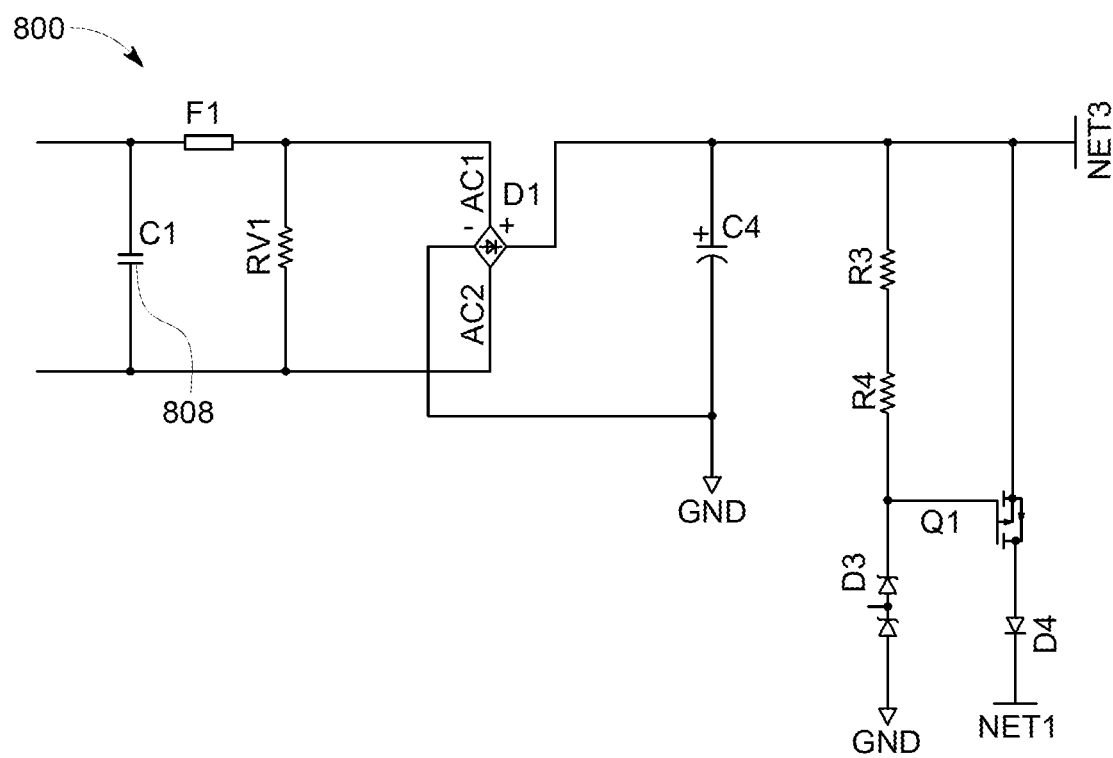
FIGS. 9A-9D illustrates a circuit topology diagram for the electrical interface between an existing ballast of an HID lamp and the LED lamp, according to some embodiments.
Figure 9B:
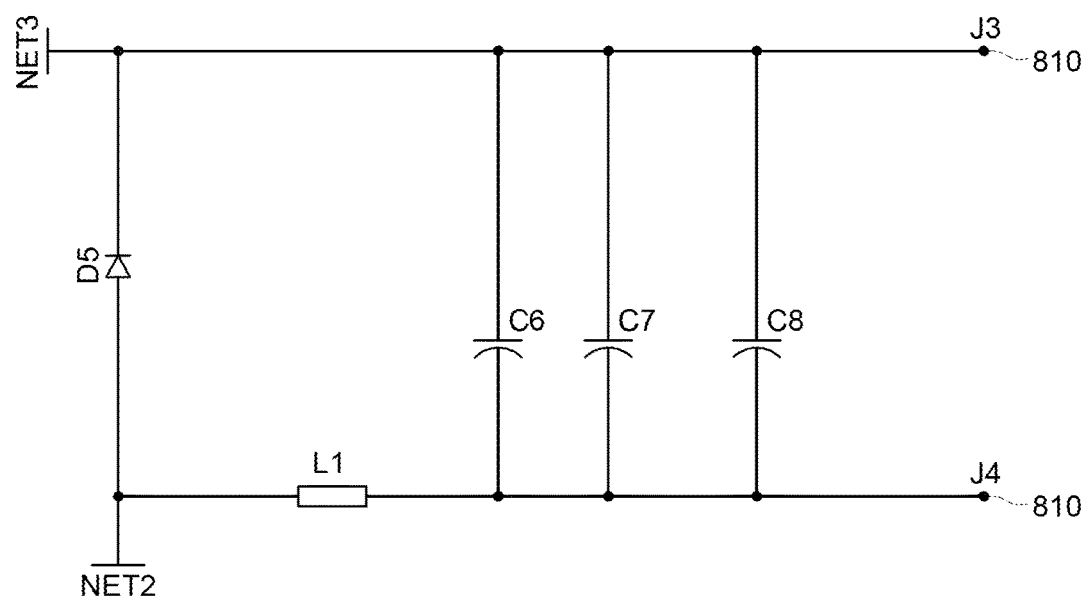
Figure 9C:
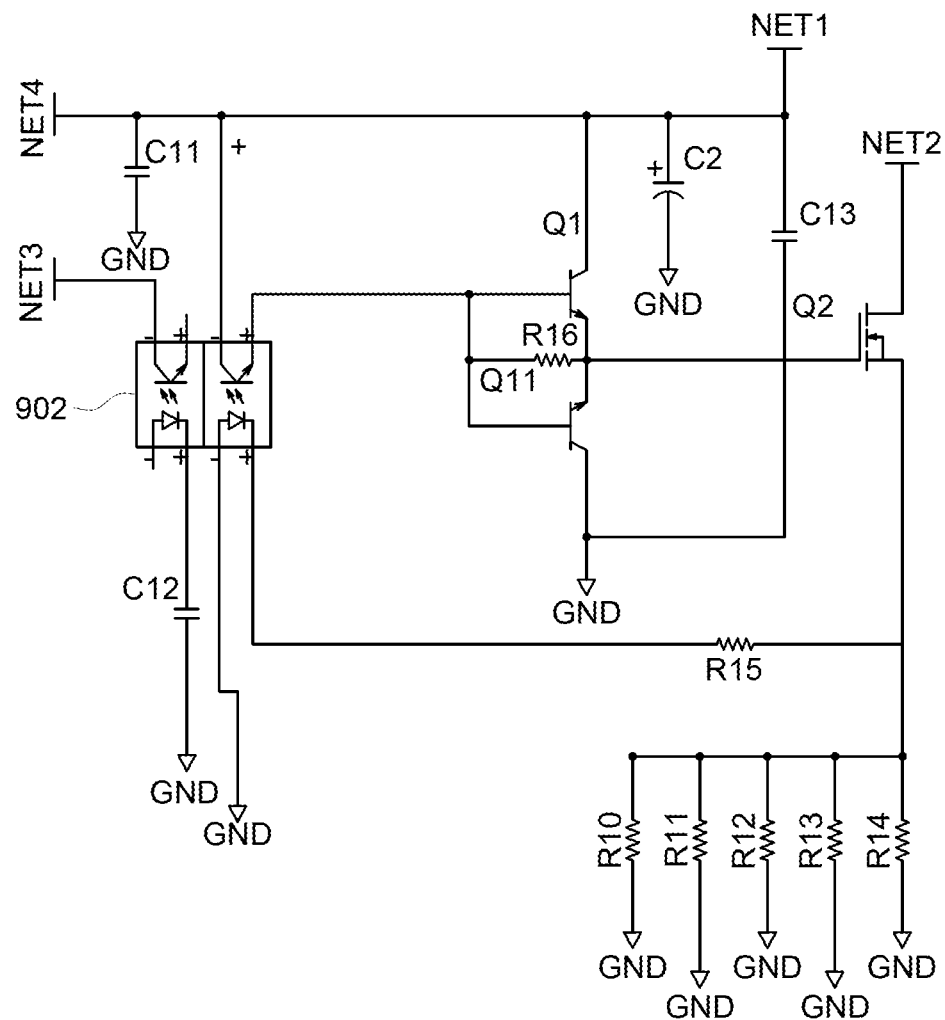
Figure 9D:
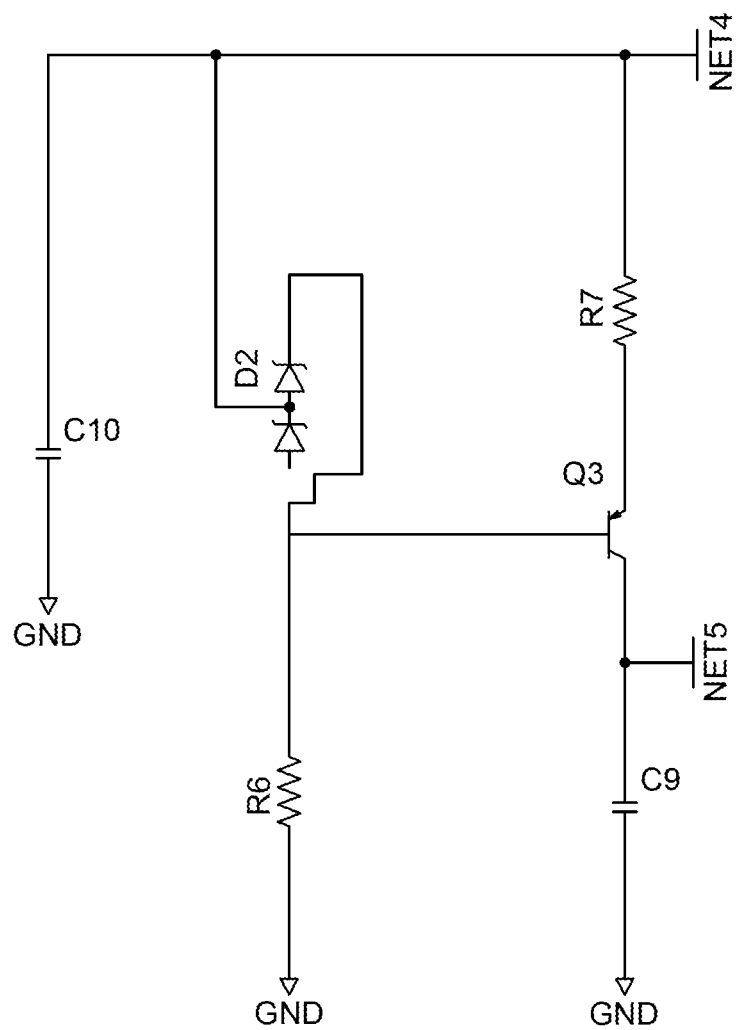

Turning to FIGS. 9A-9D an example of another circuit topology diagram for the electrical interface between the existing ballast of an HID lamp and the LED lamp, according to some embodiments is provided. The design shown in FIGS. 9A-9D may control LED power more effectively via the addition of an IC chip called a Buck converter (U1A) 902 (FIG. 9C), as the input line voltage to the ballast is varied or from ballast to ballast. FIG. 9A illustrates an input section of the circuit, where the ballast output is connected to driver output 810. FIG. 9B is a continuation of the circuit shown in FIG. 9A, and includes driver output 810 connected to the LED load. FIG. 9C is a continuation of the circuit topology shown in FIGS. 9A and 9B. FIG. 9D is a continuation of the circuit topology shown in FIGS. 9A, 9B and 9C.

Figure 8D:
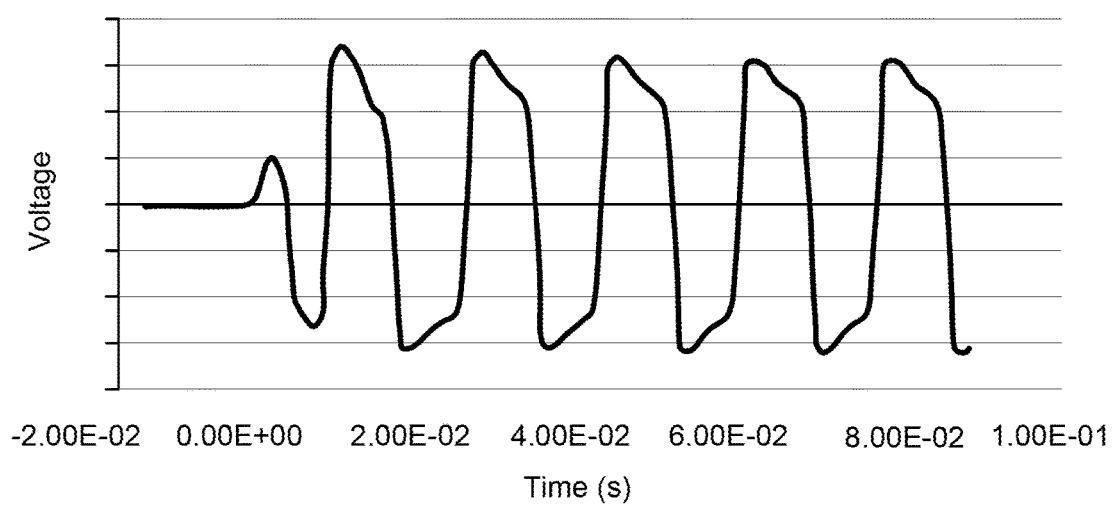
FIG. 8D illustrates a graph of ballast output for an LED lamp according to some embodiments.

In one or more embodiments, the EC 804 in FIGS. 8A and 8B and the capacitor (C1) 808 in FIGS. 8B and 9A may control the total load voltage of the LED 204, and therefore may control whether an ignitor (as indicated by ignitor pulses 812 shown in FIG. 8C) (often found in existing ballasts) is turned ON or OFF. The ignitor pulses of existing ballasts may occur at every half cycle, and may generate an output as a 3000-5000 V spike, typically a few microseconds in pulse width. An output of this size from the ignitor in the LED retrofit lamp design 200 may induce negative consequences to the life time of the electronic components. Of note, the ignitor cannot turn ON if the load voltage is always at a suitable low value, such as 92V or 140 V. In some embodiments the EC 804 and capacitor 808 may maintain the load voltage at 92V or 140V. In one or more embodiments, the lamp design 200 may include a thermal overload switch (not shown) operative to shut off or limit the current to an acceptable level of heat buildup. The inventors note the importance of the critical function or role the EC plays in proper and safe operation of embodiments of the LED retrofit lamp design 200. Some existing HID ballasts may have large ignitor pulses of 3000-5000V, to aid starting of conventional HID lamps. Such a large ignition pulse may be detrimental to LED drivers, and indeed the LED chips themselves. The EC's role is to completely suppress these large ignitor pulses, as shown in FIG. 8D, which illustrates the output of ballast with the LED load connected, and the EC 804 connected as shown in FIGS. 8A-9A, where the complete absence of the ignitor pulses may be a direct result of the EC 804. In other words, the electronic driver 208, including the EC 804, may substantially eliminate one or more high ignition voltage spikes generated by the HID ballast. In one or more embodiments, the EC 804 may force the output of the HID ballast to be much lower, roughly equal to the LED string voltage, which is typically about 80-140V, by diverting some of the ballast output current through the EC 804. This current, multiplied by the impedance of EC (1/wC) may force the voltage across the EC 804 to be low, and at this low voltage, the ignitor pulse may not fire.

Figure 10A:
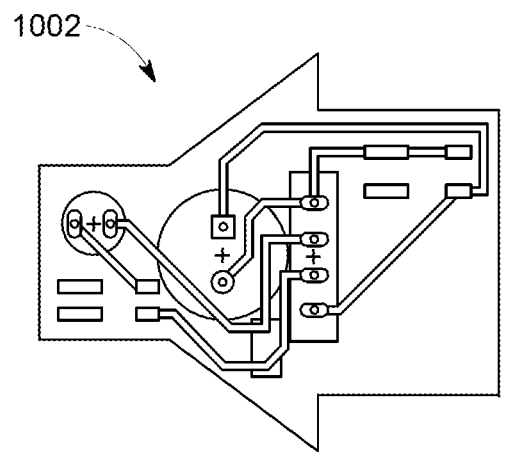
FIGS. 10A and 10B illustrate an example of a printed circuit board (PCB) layout of the rectifier design of FIGS. 8B and 9A-D, according to some embodiments.
Figure 10B:
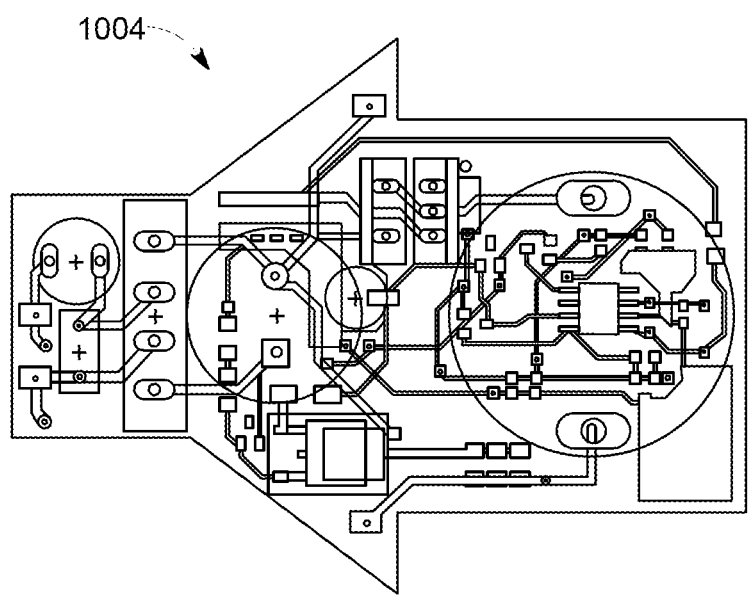

Turning to FIGS. 10A and 10B illustrate an example of a printed circuit board (PCB) 1002, 1004, layout of the rectifier design of FIGS. 8B and 9A-D, respectively. In one or more embodiments, the design of each of the PCBs 1002, 1004 may fit inside the annular region 212 of the heat sink 202. In one or more embodiments, the PCB 1002, 1004 may fit in the base region (e.g., capper) 210 of the lamp 200.

Figure 11A:
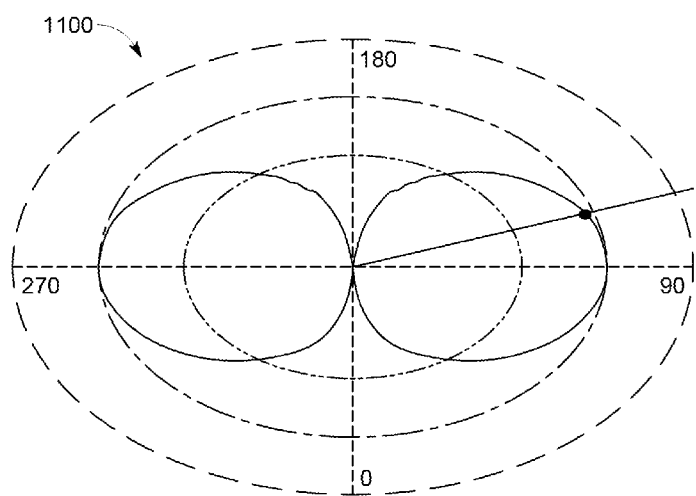
FIGS. 11A-B illustrate a light intensity distribution provided by the LED lamp design, according to some embodiments.
Figure 11B:
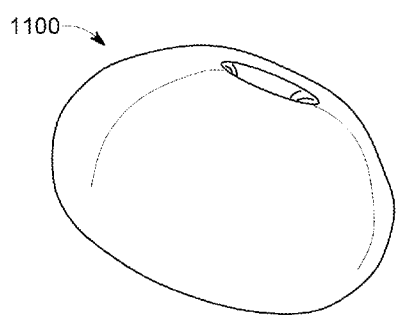

Turning to FIGS. 11A-B a light intensity distribution 1100 provided by the LED lamp design 200, according to some embodiments, is provided. FIG. 11A provides a polar plot for light distribution provided by the LED lamp design, and FIG. 11B provides a corresponding 3-D version (e.g., a surface generated when the polar plot in FIG. 11A is rotated along the 0-180 axis). As seen herein, the light provided by the linearly placed LEDs is uniformly distributed (omnidirectional) in the lamp design. In one or more embodiments, the distribution of the light may be varied. For example, the light distribution may be varied by the use of a PCB with LEDs arranged thereon placed on an end of the lamp housing to provide axial light, or by the selective populating of PCBs with LEDs arranged thereon, around the heat sink 202 to direct light in favorable directions, and/or the populating of PCBs with LEDs arranged thereon on a rotatable base to selectively generate a light distribution once the lamp 200 is installed on the ballast, or by the placement of external optics over the LEDs 204 for altering the light distribution.

Figure 11C:
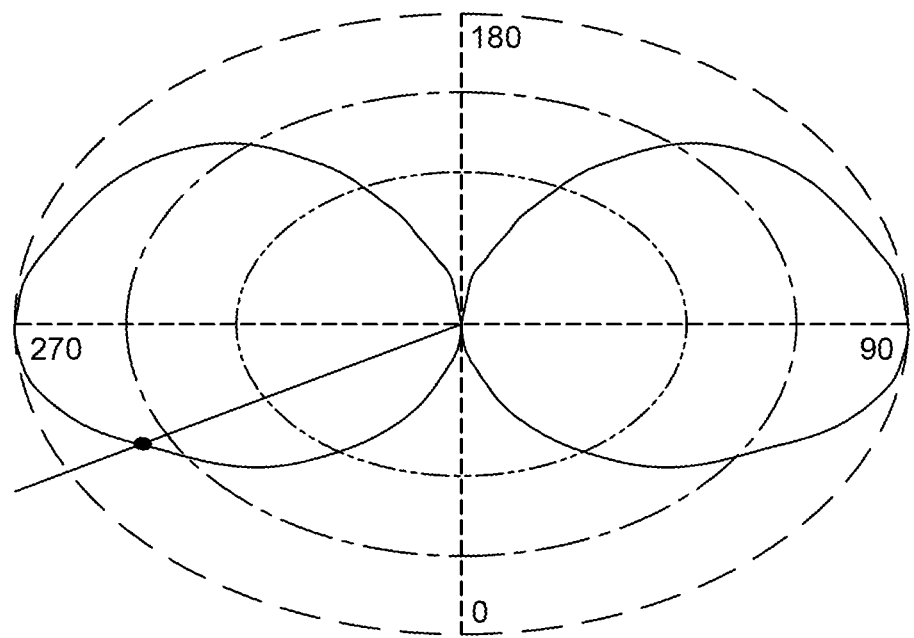
FIGS. 11C-D illustrate a light intensity distribution provided by a standard HID lamp and a conventional directional lighting product.
Figure 11D:
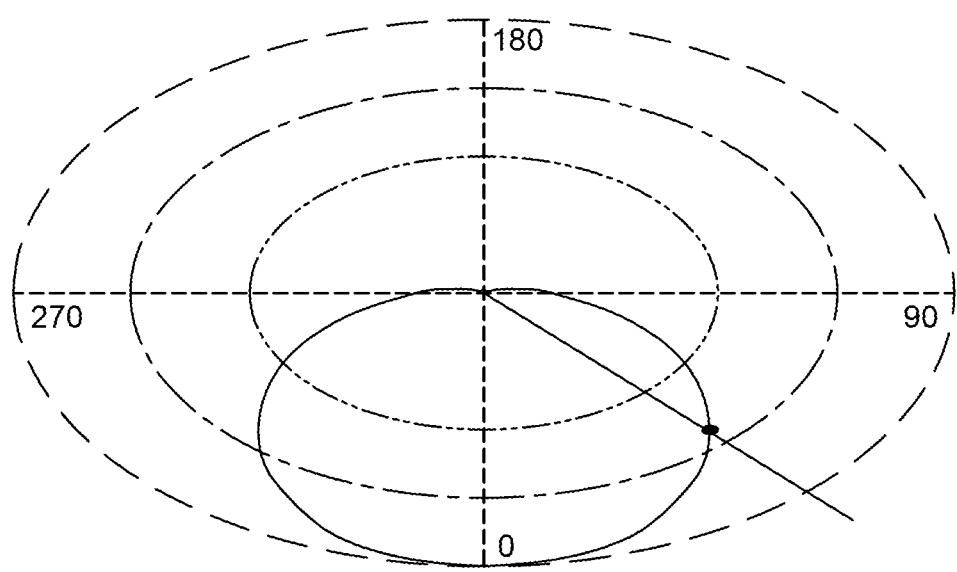

FIGS. 11C and 11D provide a polar plot for a standard HID lamp, and a conventional directional lighting product, respectively. Of note, as compared to the polar plot (FIG. 11A) for the LED lamp design provided by some embodiments, the polar plot for the standard HID lamp includes a similar polar plot, and a similar 3D light distribution is expected. Of note, a full surface revolution of the polar plot for the conventional directional lighting product (FIG. 11D) to generate a 3-D version, may provide a pear-shaped light distribution, which is not omni-directional.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application.

Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

What is claimed is:

1. A lamp comprising:
   a heat sink including:
      an annular tube including a first end and a second end,
      a plurality of fins extending radially from an exterior surface of the annular tube, wherein a length of each fin extends from the first end of the annular tube to the second end of the annular tube;
   a plurality of light sources in thermal contact with the heat sink; and
   a driver circuit operative to provide the input voltage and current for the plurality of light sources;
   the lamp further comprising an airflow generator positioned at the first end of the annular tube.

2. The lamp of claim 1, wherein a free-end of each fin is forked.

3. The lamp of claim 1, wherein the light sources are light emitting diodes (LED)s.

4. The lamp of claim 1, wherein the plurality of light sources are mounted on one or more printed circuit boards (PCB).

5. The lamp of claim 1, wherein the driver circuit is positioned within the annular tube of the heat sink.

6. The lamp of claim 1, wherein an internal diameter of the annular tube is in the range of 10-100 mm.

7. The lamp of claim 2, wherein the forked free-end of each fin includes two or more tines.

8. The lamp of claim 4, wherein the PCB is positioned between two adjacent fins along a length of the exterior surface of the annular tube between the first end and the second end.

9. The lamp of claim 1, further comprising:
   a plurality of internal fins extending from an interior surface of the annular tube.

10. The lamp of claim 1, wherein the heat sink includes eight fins.

11. The lamp of claim 1, wherein the driver includes a buck converter.

12. The lamp of claim 1, wherein the airflow generator is operative to actively cool the lamp.

13. The lamp of claim 1, wherein the flow of current to the airflow generator is in a direction from at least two LED light sources.

14. The lamp of claim 1, further comprising:
    a cover operative to cover the plurality of light sources.

15. The lamp of claim 1, wherein the lamp is operative to fit within a standard outline of a lamp per the American National Standards Institute (ANSI).

16. A lamp comprising:
    a heat sink including:
       an annular tube including a first end and a second end,
       a plurality of fins extending radially from an exterior surface of the annular tube, wherein a length of each fin extends from the first end of the annular tube to the second end of the annular tube;
    a plurality of light sources in thermal contact with the heat sink; and
    a driver circuit operative to provide the input voltage and current for the plurality of light sources;
    wherein the lamp is configured to be retro-fit into a high intensity discharge (HID) fixture.

17. The lamp of claim 1, wherein the plurality of light sources are linearly arranged.

18. The lamp of claim 1, wherein the driver is operative to convert an output of a high intensity discharge (HID) ballast to DC current to operate the light sources.

19. The lamp of claim 18, wherein the driver substantially eliminates one or more high ignition voltage spikes generated by the HID ballast.

20. A lamp comprising:
    a heat sink including:
       an annular tube including a first end and a second end,
       a plurality of fins extending radially from an exterior surface of the annular tube, wherein a length of each fin extends from the first end of the annular tube to the second end of the annular tube;
    a plurality of light sources in thermal contact with the heat sink; and
    a driver circuit operative to provide the input voltage and current for the plurality of light sources;
    wherein the plurality of light sources produce omnidirectional light, and wherein a length of the plurality of light sources mimics an arc-length of an HID lamp.

21. A housing comprising:
    an annular tube including a first end and a second end;
    a plurality of fins extending radially from an exterior surface of the annular tube; and
    wherein a length of each fin extends from the first end of the annular tube to the second end of the annular tube;
    wherein the housing is operative to be retro-fit into a high intensity discharge (HID) fixture.

22. The housing of claim 21, wherein a free-end of each fin is forked.

23. The housing of claim 21, further comprising:
a plurality of light sources in thermal contact with the housing and positioned between two adjacent fins along a length of the exterior surface of the annular tube between the first end and the second end.

24. The housing of claim 23, wherein the fins are operative to dissipate heat generated by the plurality of light sources.

* * * * *